— 
United States Patent Office 3,479,137  
Patented Nov. 18, 1969

3,479,137  
METHOD FOR IMPROVING PHYSICAL PROPERTIES OF BORIC OXIDE  
George W. Campbell, Jr., Tustin, Nelson P. Nies, Laguna Beach, and Johnny C. Atteberry, Lakewood, Calif., assignors to United States Borax & Chemical Corporation, Los Angeles, Calif., a corporation of Nevada  
No Drawing. Filed June 22, 1966, Ser. No. 559,391  
Int. Cl. C01b 35/00  
U.S. Cl. 23—149           7 Claims

ABSTRACT OF THE DISCLOSURE

Solid, finely divided boric oxide having dissolved therein from 1 to about 10%, by weight, of inorganic oxide which can be an alkali metal oxide, alkaline earth metal oxide, a refractory oxide or mixtures of the various oxides. The compositions have a much lower rate of moisture pickup than finely divided pure boric oxide and they are easier to grind to a small particle size.

---

This invention relates to boric oxide and, more particularly, it relates to improved boric oxide compositions having desirable physical properties.

As ordinarily produced, pure, finely divided boric oxide picks up water from humid air at a fairly moderate rate. This rate of absorption, of course, depends somewhat upon the particle size of the boric oxide. For example −40 +50 Tyler mesh size material can gain as much as 45% in weight in a period of six days at 75° F. and 52% relative humidity. This moisture pickup presents real problems in attempting to ship or store the material in bulk, and, at the present time, the material is not shipped nor stored in bulk primarily for this reason. However, for a large scale user or producer of boric oxide, it is obviously desirable that the material can be shipped or stored in bulk. The present invention provides a means of reducing the rate of moisture pickup of finely divided boric oxide sufficient to allow the material to be shipped or stored in bulk.

Another problem encountered is in the grinding of finely divided boric oxide. Since it is a glassy material, although rather hard, boric oxide does not in general cleave along crystallographic planes. Accordingly, it is difficult to grind the material to produce a small particle size. The present invention also provides a means of improving the grindability of boric oxide.

Furthermore, when in a finely divided state, boric oxide also tends to pick up a static charge, especially during grinding. If the material has acquired a static charge, it is extremely difficult to separate the various sized particles by usual screening methods because they tend to clump together and "blind" the screen. This invention also provides a means of reducing the tendency of boric oxide to acquire a static charge, therefore avoiding the problems associated therewith.

According to the present invention, there are provided methods for improving the physical properties of boric oxide, such as reducing the rate of moisture pickup, by incorporating in the boric oxide from about 1% to about 10%, by weight, of an inorganic oxide selected from the group consisting of the refractory oxides, alkali metal oxides and alkaline earth metal oxides, and combinations thereof. The inorganic oxide is homogeneously distributed throughout the boric oxide, that is, dissolved in the vitreous $B_2O_3$.

The boric oxide compositions of this invention have a much lower rate of moisture pickup than pure boric oxide not containing the above-recited inorganic oxides. They also possess improved grinding properties; they do not tend to pick up a static charge and it has been found that they will splinter into angular fragments to give readily screened finely divided material.

Typical of the inorganic oxides are the refractory oxides such as silicon oxide, aluminum oxide, zirconium oxide, titanium oxide, and chromium oxide. The alkali metal and alkaline earth metal oxides are exemplified by sodium oxide, potassium oxide, calcium oxide, and magnesium oxide. Preferably, the boric oxide compositions contain a combination of alkali metal oxide such as sodium oxide and refractory oxide, especially aluminum oxide and silicon oxide. A preferred total amount of inorganic oxide is in the range of from about 3 to about 6%, by weight.

The inorganic oxides are incorporated in boric oxide while it is in the molten state, before it is cooled. They can be added as the inorganic oxides themselves or as salts which decompose at the temperature of molten boric oxide, as, for example, the carbonates, nitrates or hydroxides thereof. A preferred procedure of incorporating the inorganic oxides is to dissolve them in molten boric oxide during the production of the boric oxide, such as by the procedure described by Lloyd L. Fusby, copending application Ser. No. 432,652, filed Feb. 15, 1965, and now abandoned and Lloyd L. Fusby application Ser. No. 563,015, entitled "Production of boric Oxide," filed on even date herewith, which is a continuation-in-part of said earlier application.

The alkali metal oxides appear to act as solubilizing agents for other less soluble oxides such as $Al_2O_3$, $TiO_2$ and $ZrO_2$, therefore enabling one to incorporate a larger amount of these oxides than would be possible to incorporate as the sole additive.

The following examples are presented to illustrate the present invention but it is to be understood that the invention is not limited to the specific examples given.

EXAMPLE I

Samples of pure boric oxide and boric oxide containing 2.05% and 4.03% by weight of $SiO_2$ were prepared by fusing recrystallized boric acid, and recrystallized boric acid plus silicic acid at 1000° C. in platinum crucibles for about 20 minutes, cooling, crushing the material, refusing at 1000° C. for an additional 20 minutes and again cooling and crushing. Particles of −40 +50 Tyler screen size were selected for the test. It was noted that the boric oxide containing silicon oxide screened more readily than pure boric oxide and did not cause the screen to "blind." Similarly, it was easier to grind the boric oxide containing silicon oxide. The particles were exposed in single particle deep layers to the atmosphere in a desiccator containing a saturated solution of magnesium chloride at a temperature of 75° F. This solution produces a constant atmosphere of 32% relative humidity. Moisture pickup was determined from the gain in weight of the material. After six days of exposure, pure boric oxide had gained 5.2% in weight and boric oxide samples containing 2.05% and 4.03% silicon oxide had gained 3.2% and 2.3% in weight, respectively.

EXAMPLE II

Samples of boric oxide containing 6.58% and 9.17% by weight, sodium oxide were exposed to the constant humidity atmosphere as described in Example I. After six days the boric oxide samples containing $Na_2O$ had gained 1.7% and 1.1% in weight, respectively.

EXAMPLE III

A sample of boric oxide containing a mixture of 2.41% $SiO_2$ and 1.59% $Al_2O_3$ (total of 4.00% inorganic oxides) was prepared as described in Example I. Exposure of this material to a humid atmosphere as described in Example I resulted in a weight gain of 2.2% in six days.

EXAMPLE IV

A sample of boric oxide containing a mixture of 3.61% $Na_2O$ and 2.51% $ZrO_2$ (a total of 6.12% inorganic oxides) was prepared as described in Example I. Exposure of this composition to a humid atmosphere as described in Example I resulted in a weight gain of 1.5% in six days.

EXAMPLE V

A sample of boric oxide containing a mixture of 3.20% $Na_2O$ and 3.20% $SiO_2$ (a total of 6.40% inorganic oxides) was prepared and exposed to a humid atmosphere as in Example I, resulting in a weight gain of 1.3% in six days.

EXAMPLE VI

A sample of boric oxide containing 1.27% $Na_2O$ and 0.4% $Al_2O_3$ (a total of 1.6% inorganic oxides) was prepared and exposed to a humid atmosphere as in Example I. After six days, the sample had gained 4.0% in weight.

EXAMPLE VII

Samples of the boric oxide composition described in Example VI were exposed to humid atmosphere in two separate dessicators; one having a relative humidity of 20% at 75° F. (saturated potassium acetate solution) and the other having a humidity of 52% at 75° F. (saturated sodium bisulfate solution). Samples of pure boric oxide were also exposed to the same atmosphere at the same time. The percent weight gain was measured after exposure time periods of 6 and 20 days. The results obtained were as follows:

|  | Relative Humidity, percent | After 6 days, percent | After 20 days, percent |
|---|---|---|---|
| $B_2O_3$ | 20 | 3.3 | 5.3 |
|  | 52 | 45.4 | 71.4 |
| $B_2O_3$ containing $Al_2O_3$ and $Na_2O$ | 20 | 1.4 | 2.1 |
|  | 52 | 26.6 | 37.4 |

EXAMPLE VIII

A sample of boric oxide containing a mixture of 1.93% $SiO_2$, 1.07% $Al_2O_3$ and 2.87% $Na_2O$ was prepared as described in Example I (a total of 5.8% inorganic oxides). Exposure of this material to a humid atmosphere as described in Example I resulted in a weight gain of 1.1% after six days.

EXAMPLE IX

A sample of boric oxide containing a mixture of 1.6% CaO and 1.2% $Na_2O$ (2.8% total inorganic oxides) was prepared as described in Example I. Exposure of this material to a humid atmosphere as described in Example I resulted in a weight gain of 0.8% after six days.

EXAMPLE X

A sample of boric oxide containing a mixture of 1.0% MgO and 3.2% $Na_2O$ (a total of 4.2% inorganic oxides) was prepared and exposed to a humid atmosphere as described in Example I. After six days it had gained 1.1% in weight.

EXAMPLE XI

A sample of boric oxide containing 1.1% $TiO_2$ and 3.2% $Na_2O$ (a total of 4.3% inorganic oxides) was prepared and exposed to a humid atmosphere as described in Example I. After six days it had gained 1.4% in weight.

EXAMPLE XII

A sample of boric oxide containing 5.2% $K_2O$ was prepared and exposed to a humid atmosphere as described in Example I. After six days it had gained 2.3% in weight.

EXAMPLE XIII

A sample of boric oxide containing 1.1% $TiO_2$ and 4.1% $K_2O$ (a total of 5.2% inorganic oxides) was prepared and exposed to a humid atmosphere as described in Example I. After six days it had gained 1.7% in weight.

Thus, as illustrated in the foregoing examples, boric oxide containing the inorganic oxides according to the present invention had a much lower rate of moisture pickup than pure boric oxide and was much easier to grind, screen and handle.

The boric oxide compositions are especially suitable for use in the glass industry since the inorganic oxides such as $SiO_2$, $Al_2O_3$, $K_2O$, CaO, and $Na_2O$ are usual components in glass making compositions.

What is claimed is:

1. The method for improving the grinding properties and reducing the rate of moisture pickup of finely divided boric oxide which comprises incorporating in boric oxide, while molten, a total of from about 1 to about 10 percent, by weight, of one or more inorganic oxides selected from the alkali metal oxides, alkaline earth metal oxides, silicon oxide, aluminum oxide, zirconium oxide, titanium oxide, and chromium oxide, cooling the resultant boric oxide to give a hard, glassy product, and grinding the glassy material to give said improved finely divided boric oxide having said inorganic oxides dissolved therein.

2. The method according to claim 1 wherein a total of from about 3 to about 6 percent, by weight, of said inorganic oxide is dissolved in said boric oxide.

3. The method according to claim 1 in which said inorganic oxide is a mixture of sodium oxide and silicon oxide.

4. The method according to claim 1 in which said in organic oxide is a mixture of sodium oxide, silicon oxide, and aluminum oxide.

5. The method according to claim 1 in which said inorganic oxide is sodium oxide.

6. The method according to claim 1 wherein said inorganic oxide is a mixture of sodium oxide and calcium oxide.

7. The method according to claim 1 in which the majority of said hard, glassy product is ground to pass through a 40 mesh screen.

References Cited

UNITED STATES PATENTS 2,527,618   10/1950   Bozich _____ 23—59

OTHER REFERENCES

Foex, Annales de Chimie, Series 11, Tome 11, 1939, pp. 359–452 (pp. 359, 360, 375, 376, 378, 381, 384, 442 to 448 relied on).

HERBERT T. CARTER, Primary Examiner

U.S. Cl. X.R.

106—47, 54